(12) United States Patent
Chiusolo

(10) Patent No.: US 9,713,864 B2
(45) Date of Patent: Jul. 25, 2017

(54) DEBRIS COLLECTING ROTARY TOOL ATTACHMENT

(71) Applicant: Justin Chiusolo, Hackensack, NJ (US)

(72) Inventor: Justin Chiusolo, Hackensack, NJ (US)

( * ) Notice: Subject to any disclaimer, the term of this patent is extended or adjusted under 35 U.S.C. 154(b) by 0 days.

(21) Appl. No.: 14/963,405

(22) Filed: Dec. 9, 2015

(65) Prior Publication Data

US 2017/0165802 A1 Jun. 15, 2017

(51) Int. Cl.
*B23Q 11/00* (2006.01)
*B23B 45/00* (2006.01)

(52) U.S. Cl.
CPC ........ *B23Q 11/0071* (2013.01); *B23B 45/003* (2013.01); *B23Q 11/0064* (2013.01); *B23B 2260/058* (2013.01); *B23B 2260/10* (2013.01); *B23B 2270/30* (2013.01); *B23Q 11/0042* (2013.01); *Y10T 408/50* (2015.01)

(58) Field of Classification Search
CPC .............. Y10T 408/50; B23Q 11/0071; B23Q 11/0064; B23Q 11/0046; B23Q 11/0042; B23B 2270/30; B23B 2260/058; B23B 47/34

See application file for complete search history.

(56) References Cited

U.S. PATENT DOCUMENTS

| | | | |
|---|---|---|---|
| 2,548,314 A * | 4/1951 | Kinney, Sr. | ........ B23Q 11/0064 269/8 |
| 3,583,821 A | 6/1971 | Shaub | |
| 3,936,213 A | 2/1976 | Kappel | |
| 5,653,561 A | 8/1997 | May | |
| 7,175,371 B2 | 2/2007 | Vidal | |
| D575,311 S | 8/2008 | Koneeny | |
| 2004/0141820 A1 | 7/2004 | Mikon et al. | |
| 2005/0047880 A1 | 3/2005 | Seely | |
| 2008/0217343 A1 * | 9/2008 | Roefer | ............... B23Q 11/0042 220/669 |

FOREIGN PATENT DOCUMENTS

| | | | | |
|---|---|---|---|---|
| DE | 3113496 A1 | * | 10/1982 | ......... B23Q 11/0053 |
| JP | 2006224289 A | * | 8/2006 | |

OTHER PUBLICATIONS

Machine translation, Japan patent document, JP2006224289 (A), "Chip Receiver", Kuwabara, M., Aug. 2006.*

* cited by examiner

*Primary Examiner* — Daniel Howell
*Assistant Examiner* — Chwen-Wei Su

(57) ABSTRACT

A debris collecting rotary tool attachment for collecting debris during rotary tool use includes a shell that comprises a wall. The wall extends from a top to a bottom of the shell and has an inner face. The inner face is tackified, such that the inner face is configured to sequester debris on the inner face of the shell. The top and the bottom are open, defining respective perimeters. A fastener is coupled to the bottom and extends around the perimeter of the bottom. The fastener is configured to sealably couple the shell to a chuck end of a rotary tool. The shell is positioned around a cutting tool secured in the chuck of the rotary tool. The inner face is tackified to sequester debris generated during operation of the rotary tool.

13 Claims, 4 Drawing Sheets

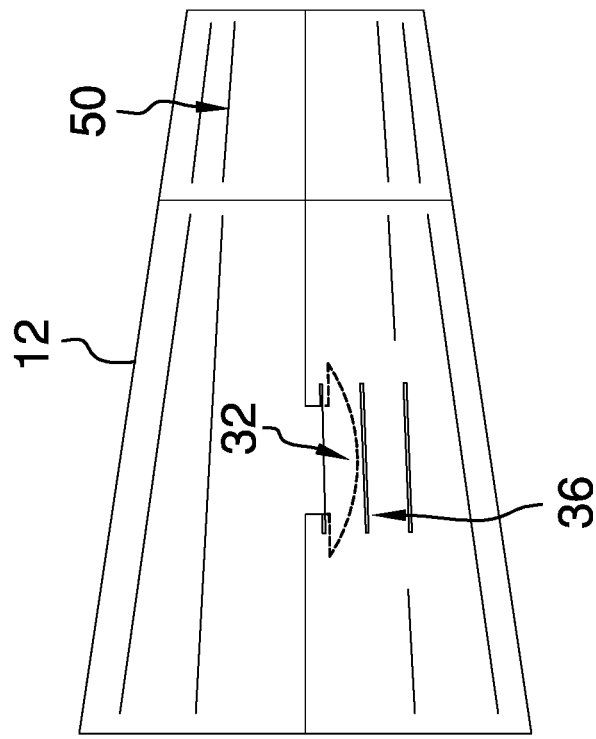
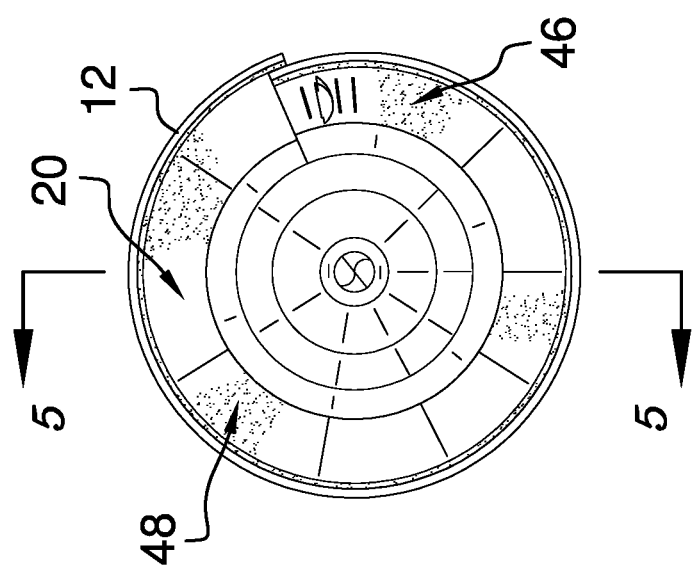
FIG. 3
FIG. 4

DEBRIS COLLECTING ROTARY TOOL ATTACHMENT

BACKGROUND OF THE DISCLOSURE

Field of the Disclosure

The disclosure relates to rotary tool attachments and more particularly pertains to a new rotary tool attachment for collecting debris during rotary tool use.

SUMMARY OF THE DISCLOSURE

An embodiment of the disclosure meets the needs presented above by generally comprising a shell that comprises a wall. The wall extends from a top to a bottom of the shell and has an inner face. The inner face is tackified, such that the inner face is configured to sequester debris on the inner face of the shell. The top and the bottom are open, defining respective perimeters. A fastener is coupled to the bottom and extends around the perimeter of the bottom. The fastener is configured to sealably couple the shell to a chuck end of a rotary tool. The shell is positioned around a cutting tool secured in the chuck of the rotary tool. The inner face is tackified to sequester debris generated during operation of the rotary tool.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a side view of an embodiment of the disclosure.

DESCRIPTION OF THE PREFERRED EMBODIMENT

Figure 1:
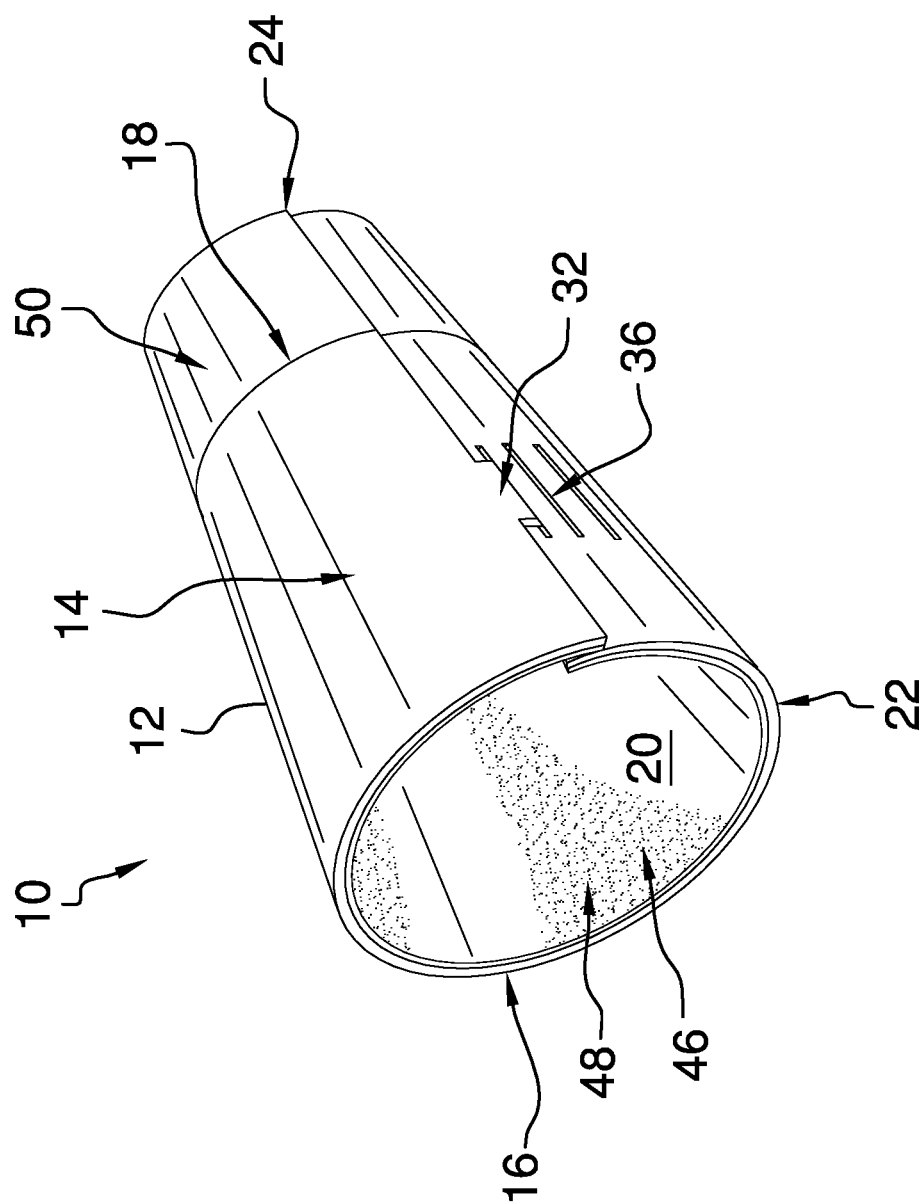
FIG. 1 is an isometric perspective view of a debris collecting rotary tool attachment according to an embodiment of the disclosure.
Figure 2:
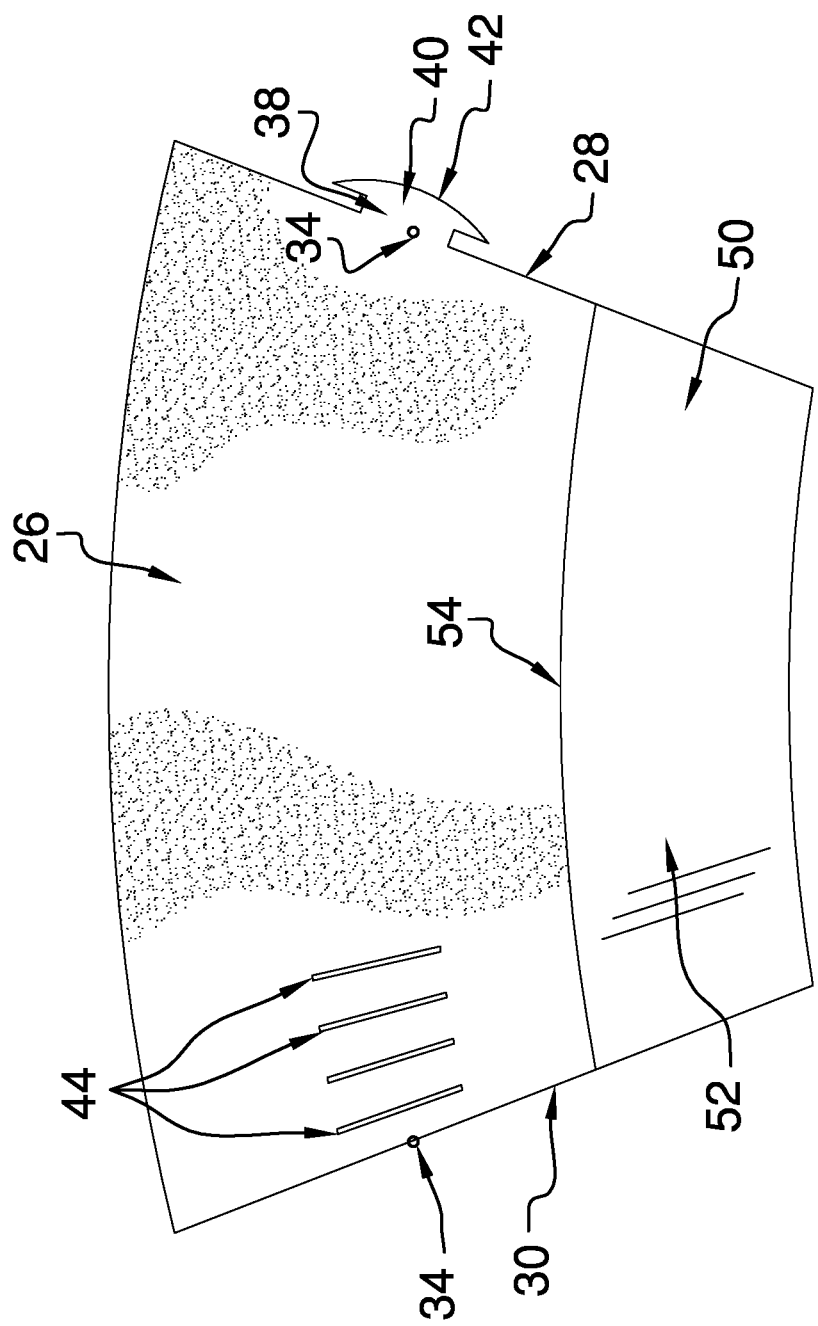
FIG. 2 is an inside view of an embodiment of the disclosure.
Figure 5:
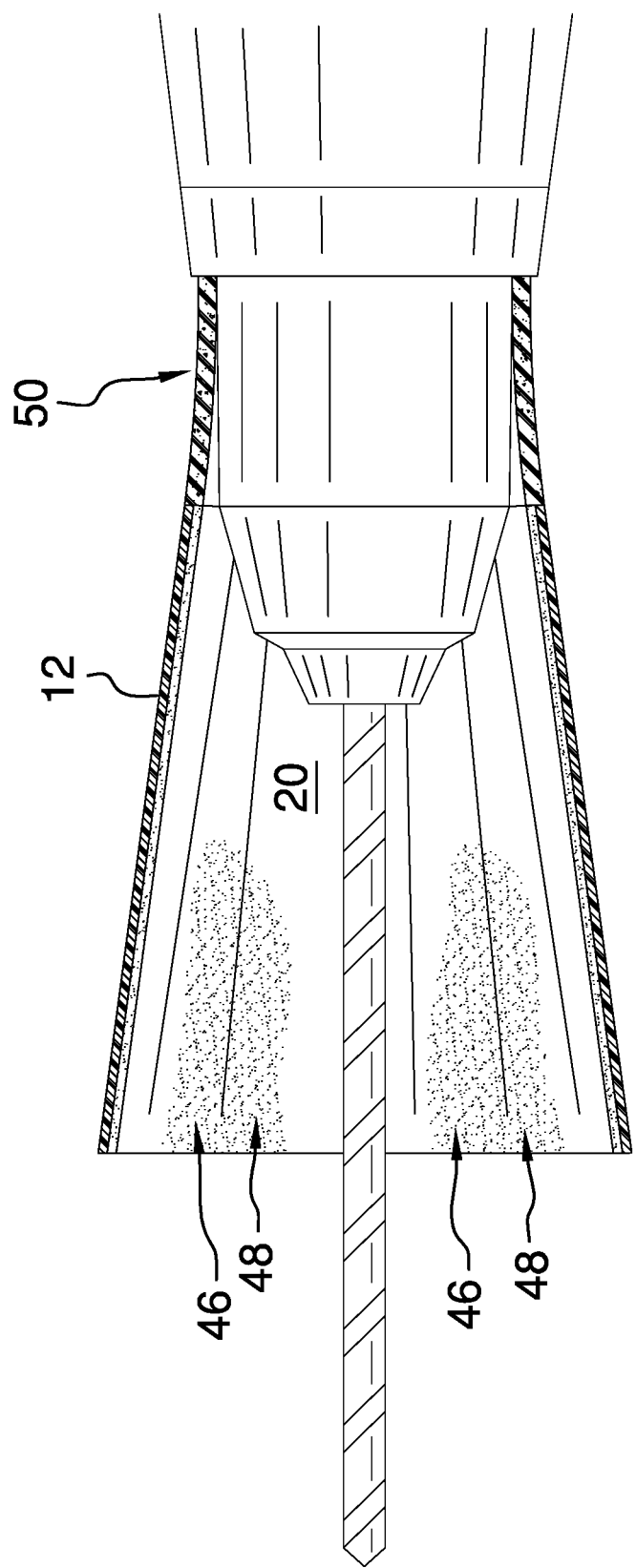
FIG. 5 is a cross-sectional view of an embodiment of the disclosure.

With reference now to the drawings, and in particular to FIGS. 1 through 5 thereof, a new rotary tool attachment embodying the principles and concepts of an embodiment of the disclosure and generally designated by the reference numeral 10 will be described.

As best illustrated in FIGS. 1 through 5, the debris collecting rotary tool attachment 10 generally comprises a shell 12 that comprises a wall 14. The wall 14 extends from a top 16 to a bottom 18 and has an inner face 20 that is tackified, such that the inner face 20 is configured to sequester debris on the inner face 20 of the shell 12.

The top 16 and the bottom 18 are open, defining respective perimeters 22. The shell 12 is substantially conical and substantially transparent. Preferably, the shell 12 has a longitudinal cut 24, such that the shell 12 is reconfigurable into a panel 26. The panel 26 is substantially flat. The longitudinal cut 24 defines a first edge 28 and a second edge 30 of the panel 26.

A first coupler 32 is coupled to the panel 26 proximate to a midpoint 34 of the first edge 28. A second coupler 36 is coupled to the panel 26 proximate to the midpoint 34 of the second edge 30. The second coupler 36 is complimentary to the first coupler 32, such that the second coupler 36 is positioned to couple to the first coupler 32 to reconfigure the panel 26 into the shell 12.

Preferably, the first coupler 32 comprises a tab 38 and a flare 40. The tab 38, which is substantially rectangular, is coupled to the panel 26 and extends coplanarly from the panel 26 proximate to the midpoint 34 of the first edge 28. The flare 40 is coupled to the tab 38 distal from the first edge 28. The flare 40 is coplanar with the tab 38 and the panel 26. The flare 40 is dimensionally wider than the tab 38 and has an outer edge 42 that is arcuate.

The second coupler 36 comprises a plurality of slots 44 that is positioned in parallel proximate to the midpoint 34 of the second edge 30. The slots 44 are parallel to the second edge 30 and complementary to the tab 38. A respective slot 44 is positioned for insertion of the flare 40 and the tab 38 to reconfigure the panel 26 into the shell 12. The perimeter 22 of the bottom 18 is dimensioned based on which slot 44 receives the tab 38.

An adherent 46 is coupled to the inner face 20 of the shell 12, such that the adherent 46 is configured to sequester debris on the inner face 20 of the shell 12. Preferably, a magnetic material 48 is coupled to the inner face 20 of the shell 12, such that the magnetic material 48 is configured to sequester ferromagnetic debris on the inner face 20 of the shell 12. More preferably, both the adherent 46 and the magnetic material 48 are coupled to the inner face 20 of the shell 12.

A fastener 50 is coupled to the bottom 18 and extends around the perimeter 22 of the bottom 18. The fastener 50 is configured to sealably couple the shell 12 to a chuck end of a rotary tool. The fastener 50 comprises an extension 52 of a short edge 54 of the panel 26, such that the fastener 50 is conically shaped when the panel 26 is reconfigured into the shell 12. The fastener 50 is deformable, such that the fastener 50 is compressible between the shell 12 and the rotary tool. This allows a cutting tool positioned in the chuck to be positioned in contact with a work piece. Preferably, the fastener 50 is rubberized and configured to sealably couple to the chuck of a rotary tool, such that the shell 12 will rotate in tandem with the chuck.

The present invention also anticipates a protective sheet reversibly coupled to the inner face 20 of the shell 12. The protective sheet would be removed prior to use.

In use, the fastener 50 is configured to couple the shell 12 to the chuck end of a rotary tool. The fastener 50 forms a seal to the rotary tool and positions the shell 12 around a cutting tool secured in the chuck. The inner face 20, being tackified, sequesters debris generated during operation of the rotary tool.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A debris collecting rotary tool attachment comprising:
a shell, said shell comprising a wall extending from a top to a bottom, said wall having an inner face, said top and said bottom being open defining respective perimeters, said shell having a longitudinal cut, wherein said shell is reconfigurable into a panel, said panel being substantially flat, said longitudinal cut defining a first edge and a second edge of said panel;
said inner face being tackified, wherein said inner face is configured to sequester debris on said inner face of said shell;
a fastener, said fastener being coupled to said bottom and extending around said perimeter of said bottom, said fastener being configured to sealably couple said shell to a chuck end of a rotary tool; and
wherein said fastener is configured to couple said shell to the chuck end of a rotary tool, such that said fastener forms a seal to the rotary tool and positions said shell around a cutting tool secured in the chuck, wherein said inner face being tackified sequesters debris generated during operation of the rotary tool.

2. The attachment of claim 1, further including said shell being substantially conical.

3. The attachment of claim 1, further including said shell being substantially transparent.

4. The attachment of claim 1, further comprising:
a first coupler, said first coupler being coupled to said panel proximate to a midpoint of said first edge;
a second coupler, said second coupler being coupled to said panel proximate to a midpoint of said second edge, said second coupler being complimentary to said first coupler; and
wherein said second coupler is positioned to couple to said first coupler to reconfigure said panel into said shell.

5. The attachment of claim 1, further comprising:
a tab, said tab being coupled to said panel and extending coplanarly from said panel proximate to a midpoint of said first edge, said tab being substantially rectangular;
a flare, said flare being coupled to said tab distal from said first edge, said flare being coplanar with said tab and said panel, said flare being dimensionally wider than said tab, said flare having an outer edge, said outer edge be arcuate;
a plurality of slots, said slots being positioned in parallel proximate to a midpoint of said second edge, said slots being parallel to said second edge, said slots being complimentary to said tab; and
wherein a respective said slot is positioned to receive said flare and said tab to reconfigure said panel into said shell, such that said perimeter of said bottom is dimensioned based on positioning of said respective said slot relative to said second edge.

6. The attachment of claim 1, further including an adherent, said adherent being coupled to said inner face of said shell, wherein said adherent is configured to sequester debris on said inner face of said shell.

7. The attachment of claim 1, further including a magnetic material, said magnetic material being coupled to said inner face of said shell, wherein said inner face is configured to sequester ferromagnetic debris on said inner face of said shell.

8. The attachment of claim 1, further comprising:
an adherent, said adherent being coupled to said inner face of said shell;
a magnetic material, said magnetic material being coupled to said inner face of said shell; and
wherein said adherent and said magnetic material are configured to sequester non-ferromagnetic and ferromagnetic debris on said inner face of said shell.

9. The attachment of claim 1, further including said fastener comprising an extension of a short edge of said panel, wherein said fastener is conically shaped when said panel is reconfigured into said shell.

10. The attachment of claim 1, further including said fastener being deformable, such that said fastener is compressible between said shell and the rotary tool and wherein a cutting tool positioned in the chuck can be positioned to contact a work piece.

11. The attachment of claim 10, further including said fastener being rubberized.

12. The attachment of claim 1, further including said fastener being configured to sealably couple to the chuck of a rotary tool, wherein said shell will rotate in tandem with the chuck.

13. A debris collecting rotary tool attachment comprising:
a shell, said shell comprising a wall extending from a top to a bottom, said wall having an inner face, said top and said bottom being open defining respective perimeters, said shell being substantially conical, said shell being substantially transparent;
said shell having a longitudinal cut, wherein said shell is reconfigurable into a panel, said panel being substantially flat, said longitudinal cut defining a first edge and a second edge of said panel;
a first coupler, said first coupler being coupled to said panel proximate to a midpoint of said first edge;
said first coupler comprising:
a tab, said tab being coupled to said panel and extending coplanarly from said panel proximate to a midpoint of said first edge, said tab being substantially rectangular, and
a flare, said flare being coupled to said tab distal from said first edge, said flare being coplanar with said tab and said panel, said flare being dimensionally wider than said tab, said flare having an outer edge, said outer edge be arcuate;
a second coupler, said second coupler being coupled to said panel proximate to a midpoint of said second edge, said second coupler being complimentary to said first coupler, wherein said second coupler is positioned to couple to said first coupler to reconfigure said panel into said shell;

said second coupler comprising a plurality of slots, said slots being positioned in parallel proximate to a midpoint of said second edge, said slots being parallel to said second edge, said slots being complementary to said tab, wherein a respective said slot is positioned to receive said flare and said tab to reconfigure said panel into said shell, such that said perimeter of said bottom is dimensioned based on positioning of said respective said slot relative to said second edge;

said inner face being tackified, wherein said inner face is configured to sequester debris on said inner face of said shell;

an adherent, said adherent being coupled to said inner face of said shell, wherein said adherent is configured to sequester debris on said inner face of said shell;

a magnetic material, said magnetic material being coupled to said inner face of said shell, wherein said magnetic material is configured to sequester ferromagnetic debris on said inner face of said shell;

a fastener, said fastener being coupled to said bottom and extending around said perimeter of said bottom, said fastener being configured to sealably couple said shell to a chuck end of a rotary tool;

said fastener comprising an extension of a short edge of said panel, wherein said fastener is conically shaped when said panel is reconfigured into said shell, said fastener being deformable, such that said fastener is compressible between said shell and the rotary tool and wherein a cutting tool positioned in the chuck can be positioned to contact a work piece, said fastener being rubberized, said fastener being configured to sealably couple to the chuck of a rotary tool, wherein said shell will rotate in tandem with the chuck; and wherein said fastener is configured to couple said shell to the chuck end of a rotary tool, such that said fastener forms a seal to the rotary tool and positions said shell around a cutting tool secured in the chuck, wherein said inner face being tackified sequesters debris generated during operation of the rotary tool.

\* \* \* \* \*